April 10, 1928.
O. A. SANDBORGH
1,665,793
AUTOMATIC ELECTRIC STEAM BOILER
Filed Aug. 29, 1921
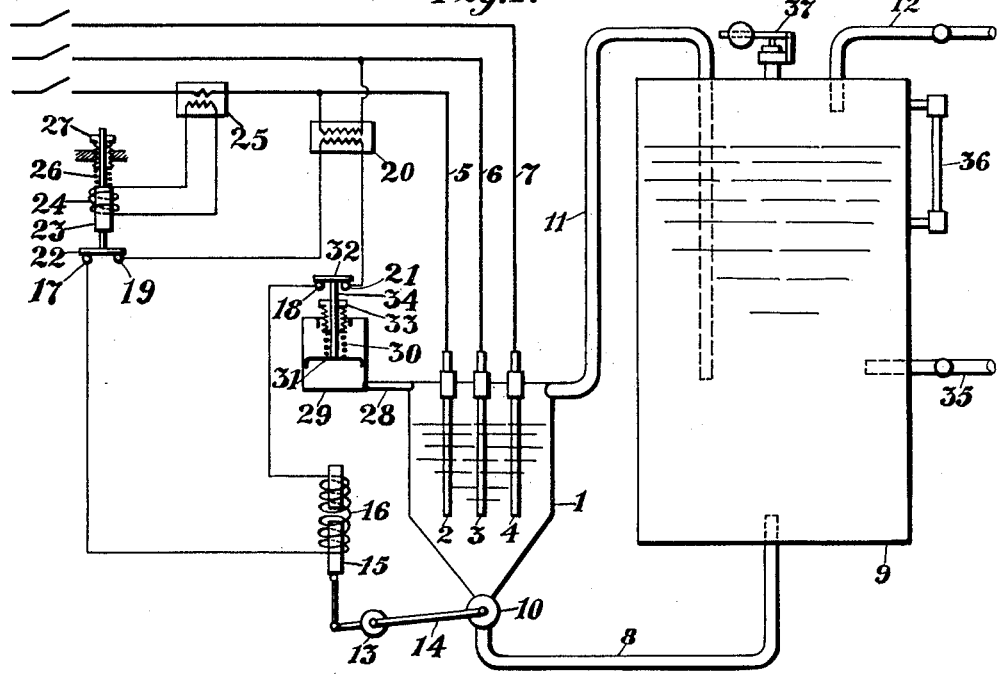
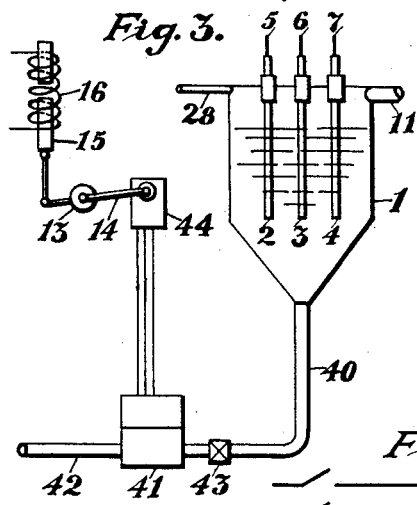
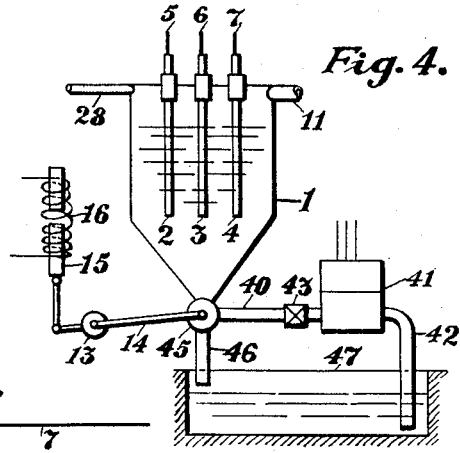
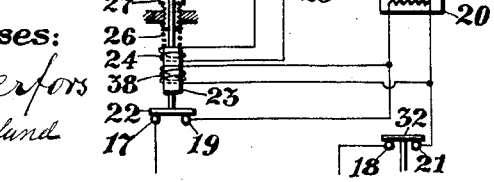
Witnesses:
Inventor.
O. Alf Sandborgh, Patented Apr. 10, 1928.

1,665,793

UNITED STATES PATENT OFFICE.

OLOF ALFRED SANDBORGH, OF STOCKHOLM, SWEDEN.

AUTOMATIC ELECTRIC STEAM BOILER.

Application filed August 29, 1921, Serial No. 496,654, and in Sweden March 1, 1920.

My invention relates to improvements in electric steam boilers or water heaters, having fixed electrodes projecting into the water, which constitutes the electric resistance between the electrodes; and the objects of my improvements are, to provide means, for the automatic regulation of the feed water, the steam production, and the energy consumption, and to afford facilities for the proper adjustment of this means, so as to obtain a practically constant regulation.

I obtain these objects, according to a convenient embodiment of the invention, the combination being so carried out, that, when the water in the steam generator falls below a certain level, thus reducing the current flowing between electrodes, which project into the water and are connected to a source of power, a relay, depending on the current strength, closes the circuit to an electromagnetic device, which thereby opens the water feed valve of the steam generator, and also that, at too high pressure in the steam generator a steam pressure relay will open the said circuit to the electromagnetic device, so that the valve will remain closed until the pressure has fallen to the normal; all shown schematically in the accompanying drawing, in which—Fig. 1 shows the steam generator with its regulating devices in a combination with a reservoir; Fig. 2 a part view with a modification of the current relay; Fig. 3 a part view of the steam generator in combination with a water feed pump with motors starting apparatus; Fig. 4 a part view of the steam generator in combination with a water feed pump with return pipe and a three-way valve.

Similar numbers refer to similar parts throughout the several views.

The steam generator 1, whose electrodes 2, 3, 4, are connected through conductors 5, 6, 7, to a three phase circuit, is at the bottom, through a pipe 8, in communication with the lower part of a water reservoir 9, which has such an elevation in relation to the steam generator 1, that the water will flow from the reservoir 9 into the generator, the flow being controlled by a valve 10. From the top of the generator 1, leads a steam pipe 11, which extends below the water level in the reservoir 9.

In the shown combination between the steam generator 1 and the reservoir 9, the flow, as generated, will stream into the water in the reservoir and heat the same. The water passes successively into the generator 1, according to the opening and closing of the valve 10, so that the water in the reservoir 9 finally becomes all heated. The reservoir 9 may therefore serve, for example, as a warm water reservoir of a heating system. It is then furnished with an outlet pipe 12 and an inlet pipe 35.

The reservoir 9 can also constitute a steam accumulator, furnished with the necessary boiler fittings, such as water gauge 36, safety valve 37, and a feed pump, feeding in through the inlet pipe 35, the accumulated steam to be led through pipe 12 to the place of utilization.

The electromagnetic device for the automatic movement of the valve 10 can be carried out in several ways, of which I prefer the following: To the spindle of the valve 10 is attached a lever 14, held in the closed position by a weight 13 or the like, the lever being linked to the core 15 of a solenoid 16, the winding of which is connected to the contacts 17 and 18 of respectively a current relay and a steam pressure relay. The other contact 19 of the current relay is connected to a transformer 20, to which also is connected the contact 21 of the steam pressure relay, with its moving contact 32 closing on the contacts 18 and 21. Closing on the contacts 17 and 19 of the current relay is a moving contact 22, attached to the core 23, of the solenoid 24, which is connected to a current transformer 25 in the feeder 5. The windings of the solenoid 24 and the current transformer may be proportioned to suit the case, the fine adjustment of the relay being done by the screw 27 regulating the tension of the spring 26 against the magnetic pull of the solenoid 24. The spring may be substituted by an adjustable weight.

To secure a constant energy consumption, when the line voltage is varying, the current relay, as shown in Fig. 2, is provided with a potential winding 38 connected to transformer 20. The winding 38 can be arranged to work differentially or cumulatively with respect to the winding 24.

To prevent the production of too high pressure in the steam generator, if the consumption of steam is lessened or stopped, the generator is provided with a steam pressure relay. This consists of a cylinder 29, in which a piston 31 is moved by the steam pressure from the generator 1, admitted through the pipe 28, the movement being opposed by the spring 30. The piston rod 34 carries the moving contact 32 previously referred to. The pressure of the spring 30 can be regulated by the screw 33, so that the relay can be made to act at any desired pressure. If the steam pressure increases over that, for which the relay is adjusted, the pressure will raise the piston 31, bringing the contact 32 from contact with the contacts 18, 21, so that the circuit of the solenoid 16 breaks, and the weight 13 will close the valve 10 and hold it closed, until the pressure falls, and the spring 30 again closes the contact 32 on the contacts 18, 21. Should the steam consumption entirely stop, the steam generation will continue only so long as the water reaches the electrodes 2, 3, 4. From this description it will be understood, that this steam generator will be entirely automatic in its actions.

The invention may evidently be modified in some respects without departing from the fundamental idea that is the basis of the same, which I illustrate in the following examples:

When the steam is used as fast as generated, the reservoir may be omitted, and the water feed pump arranged as follows: Referring to Fig. 3 the generator 1 is coupled to the pressure pipe 40 of a motor driven pump 41, the suction pipe 42 of which is coupled to any water supply. In the pipe 40 is a check valve 43 to prevent back pressure on the pump. The motor starting apparatus 44 is of the usual type and may be operated as shown or the solenoid may form a part of the starting apparatus. From this description it will be understood that the pump is started and stopped as water is demanded by the generation and consumption of the steam. In Fig. 4 is shown another combination with the feed pump, the driving motor being started in an ordinary way. The pressure pipe 40 is connected to a three way valve 45, to one side of which is connected the steam generator 1 and to the other a return pipe 46, that leads into the water supply basin 47, from which the suction pipe 42 takes its water. The valve 45 is operated by the electromagnetic device, as shown, and opens the passage from pipe 40 to the generator 1, at the same time closing the passage to pipe 46, or vice versa, as water is demanded in the steam generator, the superfluous water being returned to the basin 47. The pumping power can naturally be so adjusted that the superfluous water will be a minimum.

I am aware that prior to my invention electric steamboilers have been made with electrodes projecting into the water in combination with hand regulation. I therefore do not claim such a combination broadly; but

I claim:

1. An automatic electric steam generator comprising, a boiler, an electric power circuit, electrodes connected with the circuit and projecting into the boiler, a feed pipe connected with the boiler, a valve in the said pipe, electromechanical means for opening and closing the valve, an electric circuit to the said means, an electrically operated relay connected in the circuit of the electrodes and arranged to open and close the circuit of the electromechanical means, the relay being adjustable to any desired energy consumption of the steam generator, so that the valve will be opened, when a predetermined energy consumption is reduced by the increased resistance between the electrodes caused by the evaporation of the water in the boiler.

2. An automatic electric steam generator comprising, a boiler, an electric power circuit, electrodes connected with the circuit and projecting into the boiler, a feed pipe connected with the boiler, a valve in the feed pipe, an electromechanical device for operating the valve, an electric circuit connected to the said device, a relay in the said circuit and in the circuit of the electrodes and arranged to regulate the feed valve upon variations in the power consumption of the steam generator, and an adjustable steam pressure relay communicating with the boiler and arranged to open the circuit of the electromechanical means, so as to prevent the first said relay from operating the feed valve, when a predetermined steam pressure in the boiler has been reached.

3. In an automatic electric steam generator, the combination of a boiler, electric power mains, electrodes within the boiler, connections between the mains and the electrodes, a feed pipe to the boiler, a valve in the feed pipe, an electromechanical device for operating the valve, said device arranged to operate automatically upon variations in the energy consumption of the steam generator, and means arranged to prevent the automatic feeding of the boiler, the said means being governed by and adjustable for any desired steam pressure in the boiler.

4. An automatic electric steamboiler comprising, a steam generator, a reservoir, a pipe connection from the lower part of the generator to the reservoir, a valve in the said connection, a pipe connection from the top of the generator to the reservoir, electric power supplying mains, electrodes within the generator, connections between the mains and the electrodes, and electromechanical means for operating the valve, said means arranged to operate automatically upon variations in the energy consumption of the boiler, and variations in the steam pressure.

5. In an automatic electric steam boiler the combination of a steam generator, a reservoir, a pipe connection from the lower part of the generator to the reservoir, a valve in the said connection, a pipe connection from the top of the generator to the reservoir, electric power supplying mains, electrodes within the generator, connection between the mains and the electrodes, and electromagnetic means for opening and closing the valve, said means arranged to operate automatically upon a variation in the level of the water in the boiler.

6. In an automatic electric steam generator, the combination of a boiler, an electric power circuit, electrodes connected with the circuit and projecting into the boiler, a feed pipe connected with the boiler, a valve in the said pipe, and electromechanical means connected with the valve and a circuit, and a relay connected with the said circuit and with the circuit of the electrodes and arranged so as to close the valve, when the water level in the generator runs high and the resistance between the electrodes decreases.

7. In an automatic electric steam generator, the combination of a boiler, an electric power circuit, electrodes connected with the circuit and projecting into the boiler, and automatically operating means for feeding water into the boiler, said means depending on the strength of the current between the electrodes.

8. In an electric boiler, a casing, an electrode chamber, one or more electrodes projecting into the electrode chamber, a valve for supplying water to the casing, a valve for withdrawing water therefrom, a motor for operating one of the valves and means responsive to the specific conductivity of the water for controlling the second named valve.

In testimony whereof I affix my signature.

O. ALF. SANDBORGH.